Patented Sept. 17, 1929

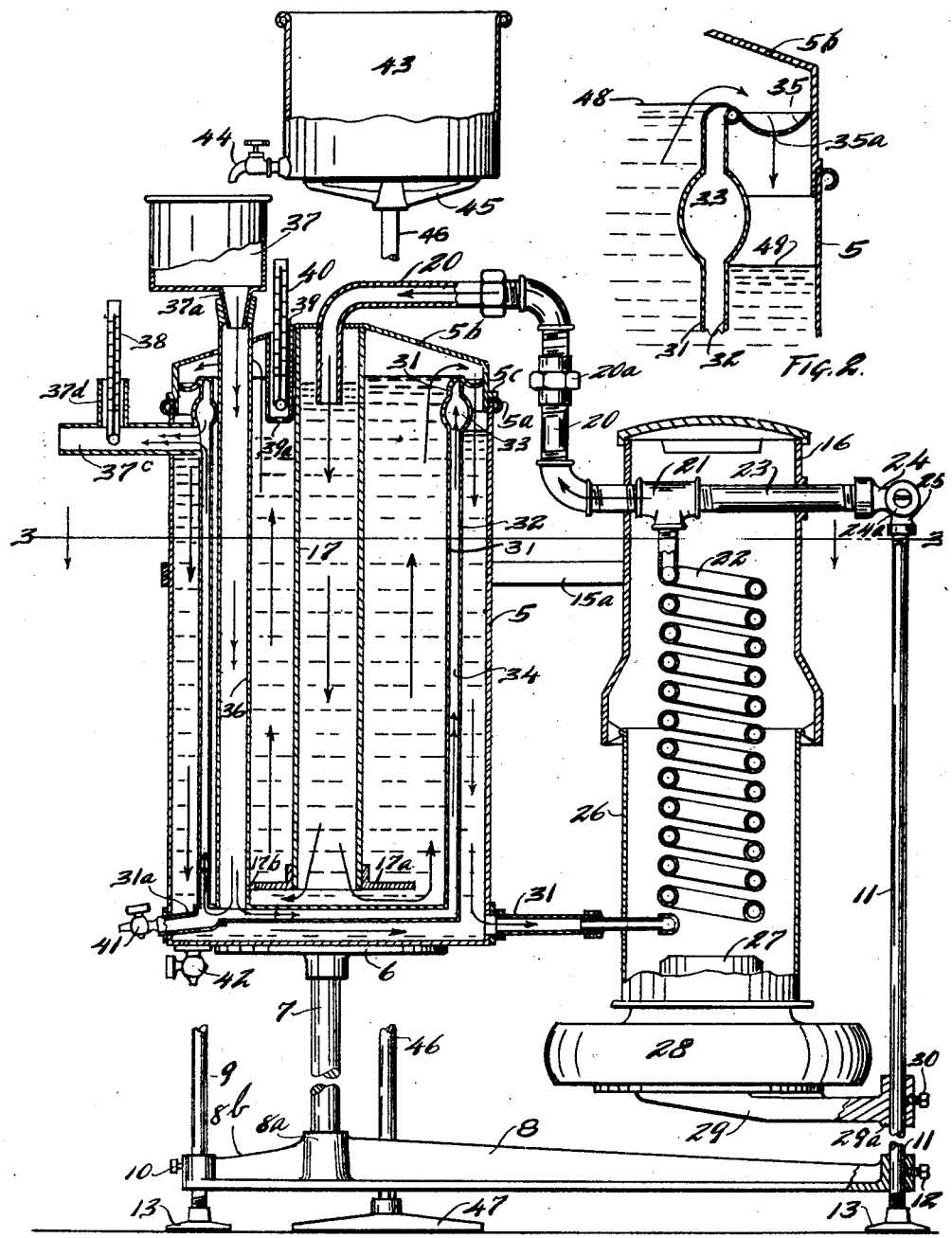

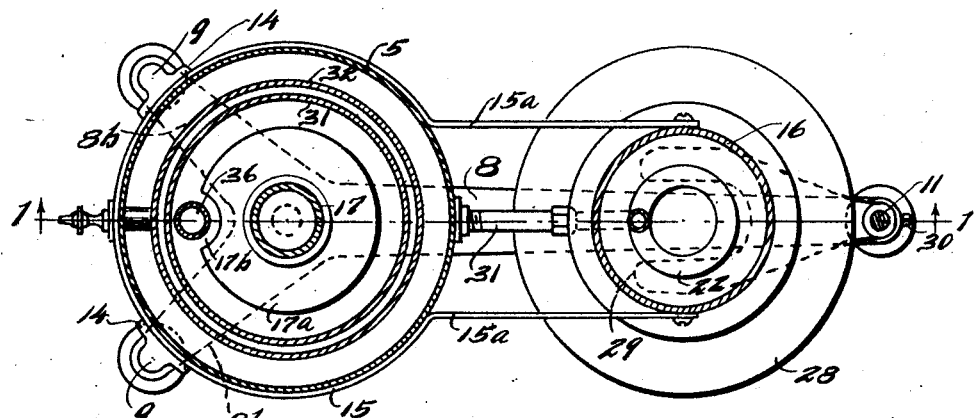
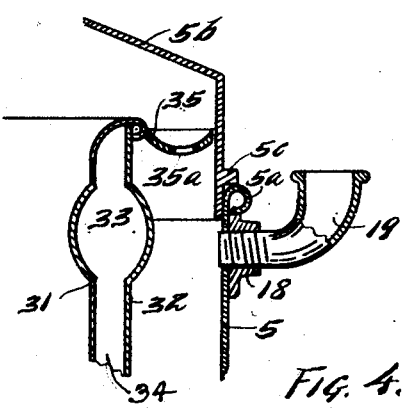

1,728,424

UNITED STATES PATENT OFFICE

DEDRICK A. MAANUM AND ALFRED J. DAVIS, OF MINNEAPOLIS, MINNESOTA

PASTEURIZING APPARATUS

Application filed September 17, 1925. Serial No. 56,926.

This invention relates to a pasteurizing or sterilizing apparatus adapted to be used for milk, cream, honey and other liquids.

It is an object of this invention to provide a very simple and efficient pasteurizing or sterilizing apparatus which is portable and self-contained and can be used in small establishments where a supply of steam under pressure is not available and where a supply of gas is not available. Such establishments may include small creameries, dairy farms and apiaries.

It is a further object of the invention to provide a simple and efficient pasteurizing and sterilizing apparatus in which the liquid being sterilized is maintained in a closed container about which hot water is circulated.

It is a further object of the invention to provide a sterilizing and pasteurizing apparatus comprising a very narrow or attenuated chamber or container enclosed in a tank, said tank having means for causing an efficient circulation of hot water about said container and from and into a water heater.

These and other objects and advantages of the invention will be fully set forth in the following description made in connection with the accompanying drawings in which like reference characters refer to the same parts throughout the different views, and in which, Fig. 1 is a view mostly in vertical section of the apparatus on the line 1—1 of Fig. 3, a portion of the apparatus being shown in elevation;

Fig. 2 is an enlarged view of a portion of Fig. 1;

Fig. 3 is a horizontal section taken on the line 3—3 of Fig. 1; as indicated by the arrows; and Fig. 4 is a vertical section similar to Fig. 2 taken at an angle thereto.

Referring to the drawings, the device is shown as comprising an outer tank 5. While this tank may be of various forms, in the embodiment of the invention illustrated, it is shown as cylindrical, being supported at its bottom upon a plate 6 supported by a standard 7, which standard is mounted at its lower end in a hub $8^a$ rising from a base member 8. The base member 8, as shown in Fig. 3, has diverging arms $8^b$ at one end having hubs or bosses at their ends through which pass the supporting rods or legs 9, said hubs having set screws 10 by which they are secured to said legs 9. The other end of member 8 also has a hub thereon through which passes the rod or leg 11 to which said hub is secured by the set screw 12. The rods 9 and 11 are equipped with suitable feet 13 into which they are threaded and the rods 9, at their upper ends, are tightly secured in brackets 14 riveted or welded to a strap 15 extending about the outer side of tank 5 for the greater portion of its periphery but having parallel portions $15^a$ extending at one side thereof, the ends of which are fastened to the sides of a hood member 16 by headed screws, said hood member to be later described. The tank 5, as shown, has a flange $5^a$ at its top illustrated as an outwardly rolled bead and a cover $5^b$ is provided for the tank having a cylindrical flange fitting telescopically into said tank and having an outwardly extending narrow flange $5^c$ resting on flange $5^a$. A central conduit 17 is secured at its top to the inner side of cover $5^b$ and extends downwardly within tank 5 and has secured to its open lower end an outwardly extending substantially circular flange $17^a$. The tank 5 has a flanged hub member 18 welded or riveted to one side thereof adjacent its top (Fig. 4) into which is threaded and revolubly mounted an elbow open-ended conduit 19.

A pipe 20 extends through cover $5^b$, being tightly fitted therein and a short distance downwardly into conduit 17, said pipe 20 extending horizontally above tank 5, then downwardly at one side thereof and then horizontally into the hood 16, in which it is connected, by means of a T member 21 to the upper end of a water coil 22, said pipe 20 including the usual standard elbows, as well as including a union coupling $20^a$. A pipe 23 is secured in one side of T 21 and extends through hood 16 having the closing cap 24 threaded onto its outer end, which cap 24 has a perforated ear $24^a$ projecting therefrom with which alines the perforated ear on another similar cap 25, said caps being connected by a headed and nutted bolt and the upper end of rod 11 being threaded into cap 25. The lower end of coil 22 extends downward into a chimney 26 of a burner or stove 27 having an oil supply reservoir 28 which rests upon a bracket 29. The bracket 29 is bifurcated, as shown in dotted lines in Fig 3, and has an arm provided with a hub 29$^a$ through which passes the rod 11, said hub being secured to rod 11 by set screws 30. The lower end of coil 22 extends out of the chimney 26 and is connected by a suitable coupling to a pipe 31 which, in turn, is connected to communicates with tank 5 at the bottom thereof.

An inner shell 31 and an outer shell 32, illustrated as cylindrical in shape, are telescoped and spaced slightly apart at their sides and bottom, and disposed in the tank 5, the outer shell 32 being spaced some distance from the wall of said tank. The shells 31 and 32 each have an annular channel adjacent their upper ends oppositely disposed to form an enlarged annular chamber 33 adjacent the top of said shells and between the walls thereof. It will be seen that a narrow attenuated chamber 34 is thus formed between shells 31 and 32, said shells forming, in effect, a container having said chamber therein. Said chamber 34 is closed at its upper end, as shown in Figs. 2 and 4 and a flange 35 which is concave or trough-shaped in vertical cross section, extends from the top of shell 32 outward nearly to the wall of the cover 5$^b$ said flange 35 having a plurality of holes or perforations 35$^a$ in the bottom thereof. A conduit 36 extends downwardly through cover 5$^b$ within inner shell 31 and is connected at its bottom to the bottom of said shell, thus communicating with the bottom of chamber 34, it being noted that flange 17$^a$ has a cut-away portion 17$^b$ accommodating this conduit. The opening through lid 5$^b$ will be large enough to pass over the upper end of conduit 36. Said conduit 36 has a flared open upper end above cover 5$^b$ and a supply receptacle 37 is provided having a tapered nozzle 37$^a$ projecting from its bottom adapted to fit snugly into said upper end of conduit 36. An outlet pipe or conduit 37$^c$ extends from one side of outer shell 32 and chamber 34 just below the enlarged portion 33, conduit 37$^c$ extending through the wall of tank 5 and having an upper arm 37$^d$ adapted to receive a thermometer 38. A shell 39 also extends downwardly into tank 5 from cover 5$^b$, said shell having a plurality of perforations 39$^a$ therein, which shell is adapted to have disposed therein a thermometer designated 40. The shells 31 and 32 and thus chamber 34 have a drain nozzle 31$^a$ at their lower end projecting out through the wall of tank 5 and provided with a suitable valve or cock 41. Tank 5 also has a drain opening at its bottom provided with a suitable valve or cock 42. A comparatively large receptacle 43 is disposed above receptacle 37 and is adapted to deliver thereinto through the valve controlled nozzle 44. Receptacle 43 is supported upon bracket 45 mounted on the upper end of a standard 46 having a foot 47 secured thereto at its lower end.

In operation, the milk, cream, honey, or other liquid to be pasteurized is placed in the receptacle 43 and allowed to pass at the proper rate through valve 44 into the receptacle 37. The liquid passes downwardly, as shown by the double-headed arrows in Fig. 1, into the bottom of chamber 34 and then rises in said chamber and passes out through the outlet 37$^c$. The stove or lamp 27, which usually is a kerosene lamp or stove, is lighted and the flame plays upon the coil 22 which is filled with water, as is also tank 5. The tank 5, when the aparatus is cold is filled with water almost to the top of flange 5$^a$ and the water in coil 22 and pipe 20 is at substantially the same level. When the water is heated in coil 22, a circulation is set up and the hot water delivered from the top of coil 22, passes from the pipe 20 into conduit 17, downwardly in said conduit, outwardly at the lower end thereof, and around the bottom of flange 17$^a$. The water then rises along the inner portion of the shell 31 along the sides of the wall thereof and flows over the top of shells 31 and 32 into trough 35. When the apparatus is operating and the heated water is in circulation, the level of water in tank 5 is, as shown in Figs. 1 and 2, the level of water within shell 31 being substantially at line 48 and the level of water in tank 5 outside of shell 32 being substantially at line 49. The water flowing into trough 35 thus drops a short distance into the water outside of shell 32 and the water then descends and re-enters coil 22 through the pipe 31. The path or circulation of the hot water is illustrated in Fig. 1 by the single headed arrows. When the water becomes cold and the apparatus is not in use, the water within shell 31 siphons back into the coil 22 so that the level of water within shell 31 and without shell 32 is the same. The elbow 19 is provided to prevent any overflow of water over the flange 5$^a$ and said elbow may be turned downwardly so that if the water level rises too high in tank 5 it will run out of said elbow into a suitable container and will not spill over the top of flange 5$^a$. The elbow 19 is also used to add water to the apparatus when in operation and the same is necessary. The enlarged chamber 33 is provided to accommodate any foam which may be caused by the heating of the liquid and allow the same to settle without interfering with the drawing off of the liquid through outlet 37$^c$. The space between the shells 31 and 32 is quite small, in practice being about $\frac{3}{32}$nds of an inch. It is thus seen that a very narrow channel of great length is provided for the travel of the liquid to be sterilized. The liquid enters at the bottom of this chamber, and it will be noted that the hottest water encounters the portion of said chamber to which the liquid is first delivered. The liquid to be sterilized is thus efficiently brought into contact with the hot water or fluid. The temperature of the water can be closely watched by means of a thermometer 40 and this temperature can be maintained with remarkable uniformity by adjustment of the lamp or stove 27.

The temperature to which the liquid in chamber 34 is raised can be closely watched by the thermometer 38 and the valve 44 is regulated so that the proper amount of liquid flows through the apparatus to maintain the liquid at the desired temperature. With these adjustments it has been found in practice that a flow of liquid can be maintained through the apparatus and raised to a practically uniform temperature and the apparatus can be kept in operation for long periods without any substantial variation in its temperature. The chamber 34 can be drained at any time by operating valve 41 and tank 5 can also be drained by operating valve 42. By removing pipe 20 the cover 5$^b$ can be lifted off together with conduit 17 and flange 17$^a$. The apparatus can then be effectively cleaned, if necessary. The set screw 30 can be loosened and the bracket dropped downwardly on the standard or rod 11, thus bringing the lamp or stove 27 out of the hood or chimney 26 so that the same can be swung to one side and removed for any necessary purpose. The device is self-contained and easily portable and forms a simple and efficient unit very suitable for small establishments. The apparatus can be produced at a price within the reach of all creameries and practically all dairy farms. The device is also very suitable for and has been used in heating honey in apiaries.

From the above description it is seen that applicant has provided a very simple, efficient, portable sterilizing and pasteurizing apparatus. The device has been amply demonstrated in actual practice and found to be very successful.

It will, of course, be understood, that various changes may be made in the form, details, arrangement and proportions of the parts without departing from the scope of applicant's invention, which, generally stated, consists in a device capable of carrying out the objects above set forth, in the novel parts and combinations of parts disclosed and defined in the appended claims.

What is claimed is:

1. A pasteurizing apparatus having in combination, a tank, a narrow annular chamber spaced from the wall of said tank and having slightly spaced sides, a central conduit, means for feeding liquid to the lower portion of said chamber, an outlet means adjacent the top thereof, and means for circulating fluid downward in said central conduit, up at the inner sides of said chamber, downwardly at the outer sides thereof, and out at the bottom of said tank.

2. A pasteurizing apparatus having in combination, a tank, inner and outer shells having their side and bottom walls spaced to form a narrow annular chamber, said chamber being closed at its top and having an enlarged annular portion adjacent its upper end, said outer shell being spaced from said tank and having a perforated flange, trough-shaped in cross section, extending outwardly from its upper end, a cover for said tank, a conduit extending into said tank and communicating with the bottom of said chamber, an outlet conduit leading from said chamber adjacent its top, and means for circulating fluid downwardly into said inner shell, upwardly along the inner side of said inner shell over the top of said shells through said perforated trough, downwardly at the outer side of said outer shell, and out at the bottom of said tank.

3. A pasteurizing apparatus having in combination, an outer tank, inner and outer shells slightly spaced at their bottoms and sides to form a narrow annular chamber, said outer shell being spaced from said outer tank and said shells being joined at the top, the outer shell having a perforated trough-shaped flange extending outwardly from its upper end, said inner shell having an open upper end, a conduit extending downward into said inner shell and having an outwardly extending flange at its lower end, a cover for said outer tank to which said conduit is secured, a conduit communicating with the lower portion of said chamber, an outlet conduit for said chamber adjacent its top, and means for circulating water into the top of said first named conduit outward beneath the flange at the bottom thereof upward in said inner shell and over the top of said shells into and through said trough-shaped flange and out at the bottom of said tank.

4. A pasteurizing apparatus having in combination, an outer tank, inner and outer shells slightly spaced at their bottoms and sides to form a narrow annular chamber, means for feeding liquid to the bottom of said chamber, outlet means adjacent the top of said chamber, said chamber being closed at its top, a trough-shaped perforated flange extending outwardly from the top of said outer shell, a cover for said outer tank, and means for circulating fluid down into said inner shell, outward at the bottom thereof, upwardly along its wall, over the top of said chamber, through said perforated flange, and out at the bottom of said tank.

5. A pasteurizing apparatus having in combination, an outer tank, inner and outer shells slightly spaced at their bottoms and sides to form a narrow annular chamber, said outer shell being spaced from said outer tank and said shells being joined at the top, means for feeding liquid to be sterilized to the bottom of said annular chamber, means for discharging liquid at the top of said chamber, said chamber having a circumferentially extending enlarged portion above said discharge means, and means for conducting liquid to the inside of said inner shell upwardly therealong and downwardly at the outer side of the said outer shell and out of the bottom of said tank.

6. A self-contained portable pasteurizing apparatus having in combination, a frame, a tank, a closed annular container having a very narrow chamber therein disposed in said tank and spaced from the walls thereof, means for feeding liquid into the bottom of said container, an outlet means for said liquid adjacent the top of said container, said tank having a removable cover thereon, a conduit secured to said cover having an open lower end and having a circumferentially extending flange at its bottom adapted to be disposed adjacent the bottom of said container at the central portion thereof and adjacent its inner wall, and means for circulating hot water into said conduit whereby it flows under said flange and upwardly over the inside wall of said container and out of the bottom of said tank.

7. A self contained portable pasteurizing apparatus having in combination, a frame, a tank supported on said frame, a narrow annular chamber having a connecting bottom portion disposed in said tank, an inlet and outlet means for said chamber adjacent its bottom and top respectively, means for directing a heated medium into the top of said tank substantially at the center thereof; an outlet means for said heated medium at the bottom and side of said tank, and means receiving said heated medium and directing the same downwardly and outwardly at the central portion of said tank whereby said medium travels upwardly at the inner side of said chamber downwardly at the outer side thereof and out at said last mentioned outlet means.

8. The structure set forth in claim 1, said narrow annular chamber having an enlarged portion extending circumferentially thereabout above and closely adjacent the outlet means therefrom.

In testimony whereof we affix our signatures.

DEDRICK A. MAANUM.
ALFRED J. DAVIS.